(12) United States Patent
Idota

(10) Patent No.: US 10,088,835 B2
(45) Date of Patent: Oct. 2, 2018

(54) FA-DEVICE-CONFIGURATION-DESIGN SUPPORTING APPARATUS AND PROGRAM

(71) Applicant: Mitsubishi Electric Corporation, Chiyoda-ku, Tokyo (JP)

(72) Inventor: Naoya Idota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 182 days.

(21) Appl. No.: 15/100,430

(22) PCT Filed: Jan. 6, 2014

(86) PCT No.: PCT/JP2014/050039
§ 371 (c)(1),
(2) Date: May 31, 2016

(87) PCT Pub. No.: WO2015/102056
PCT Pub. Date: Jul. 9, 2015

(65) Prior Publication Data
US 2016/0306345 A1    Oct. 20, 2016

(51) Int. Cl.
*G05B 19/42*    (2006.01)
*G05B 19/418*    (2006.01)
(Continued)

(52) U.S. Cl.
CPC ........ *G05B 19/41835* (2013.01); *G05B 11/01* (2013.01); *G05B 19/0426* (2013.01);
(Continued)

(58) Field of Classification Search
CPC .......... G05B 19/41835; G05B 19/0426; G05B 11/01
See application file for complete search history.

(56) References Cited

U.S. PATENT DOCUMENTS

| 7,272,458 B2 | 9/2007 | Tomita |
| 2005/0144271 A1 | 6/2005 | Shirane et al. |

(Continued)

FOREIGN PATENT DOCUMENTS

| JP | 2002-014706 A | 1/2002 |
| JP | 2004-062223 A | 2/2004 |

(Continued)

OTHER PUBLICATIONS

International Search Report for PCT/JP2014/050039 dated Feb. 4, 2014.

(Continued)

*Primary Examiner* — Vincent Tran
(74) *Attorney, Agent, or Firm* — Sughrue Mion, PLLC; Richard C. Turner

(57) ABSTRACT

An FA-device-configuration-design supporting apparatus that performs editing of a profile including individual identification information and a definition of setting of an FA device and a setting range of the setting includes a profile storing unit that stores the profile, a user-specific-information-region securing function for securing, for the profile in the profile storing unit, a write-content input region in which a setting value specific to a user can be written concerning content defined in the profile, a user-specific-information writing function for writing, in the write-content input region, the content defined by the profile edited by a first user, and a user-specific-information saving function for saving, as a user-defined profile, in the profile storing unit, the profile including the content input to the write-content input region.

12 Claims, 11 Drawing Sheets

(51) Int. Cl.
*G05B 19/042* (2006.01)
*G05B 11/01* (2006.01)
*G06F 21/44* (2013.01)

(52) U.S. Cl.
CPC .... *G06F 21/44* (2013.01); *G05B 2219/31391* (2013.01); *G05B 2219/34122* (2013.01)

(56) References Cited

U.S. PATENT DOCUMENTS

| | | | |
|---|---|---|---|
| 2008/0034225 A1* | 2/2008 | Johnson | G06F 3/0605 713/193 |
| 2008/0058969 A1* | 3/2008 | Nixon | G05B 19/0426 700/87 |
| 2011/0238190 A1 | 9/2011 | Okamoto | |
| 2011/0238375 A1 | 9/2011 | Fujisaki | |
| 2012/0185065 A1 | 7/2012 | Fuji | |
| 2014/0047342 A1* | 2/2014 | Breternitz | G06F 9/5061 715/735 |
| 2014/0108496 A1* | 4/2014 | Heller | G06F 17/30864 709/203 |
| 2014/0337071 A1* | 11/2014 | Stiffler | G06Q 10/06311 705/7.13 |
| 2014/0344796 A1* | 11/2014 | Lavoie | G01D 4/02 717/168 |
| 2015/0331901 A1* | 11/2015 | Olsen | G06Q 10/101 707/738 |

FOREIGN PATENT DOCUMENTS

| | | |
|---|---|---|
| JP | 2004-070772 A | 3/2004 |
| JP | 2004-334442 A | 11/2004 |
| JP | 2005-044109 A | 2/2005 |
| JP | 2005-327237 A | 11/2005 |
| JP | 2005-327263 A | 11/2005 |
| JP | 2006-252145 A | 9/2006 |
| JP | 2010-146195 A | 7/2010 |
| JP | 2010-231670 A | 10/2010 |
| JP | 2011-186607 A | 9/2011 |
| JP | 2011-203775 A | 10/2011 |
| JP | 2011-203954 A | 10/2011 |
| JP | 2011-215822 A | 10/2011 |
| JP | 2012-113731 A | 6/2012 |
| JP | 2012-146174 A | 8/2012 |
| JP | 2013-257685 A | 12/2013 |

OTHER PUBLICATIONS

Japanese Notice of Rejection for 2014-523869 dated Aug. 12, 2014.

* cited by examiner

FIG.10
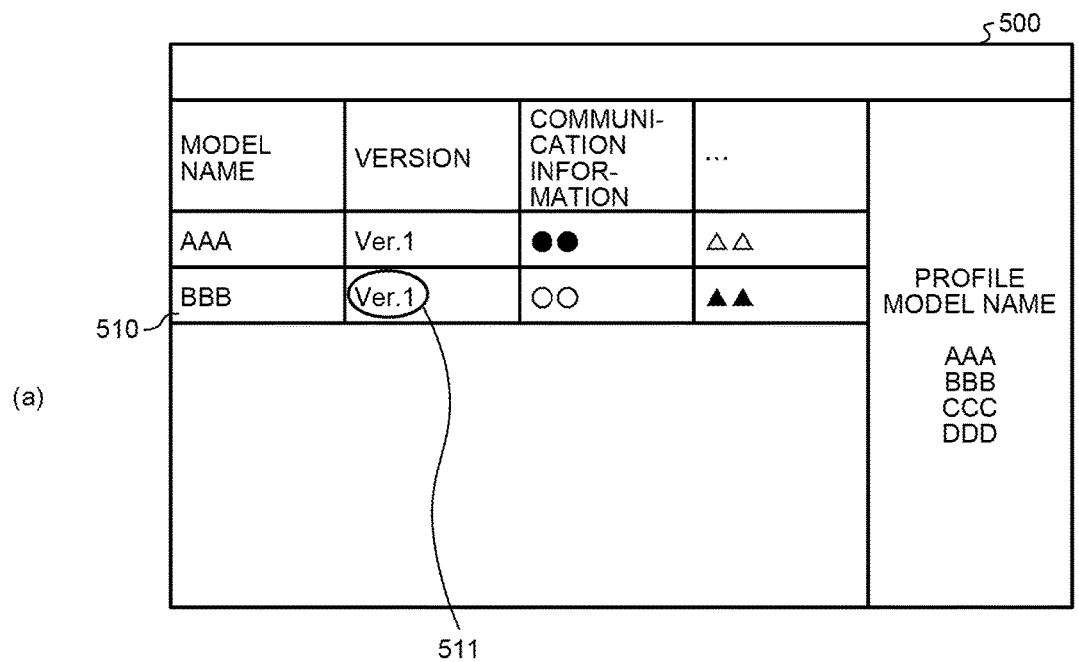
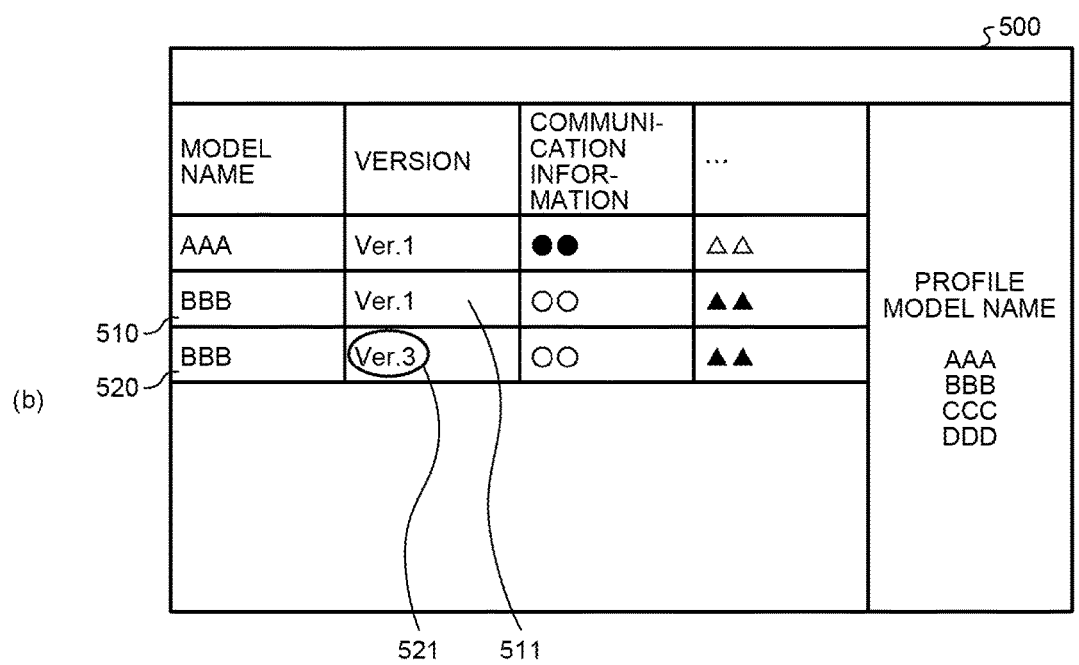

FIG.11

| SECURITY SETTING DIALOG | | |
|---|---|---|
| ☑ SET READ PASSWORD | | |
| ******** 372 | | |
| ******** 373 | | |
| ☑ SET EDITING PERMISSION | | |

| INITIAL SETTING VALUE | WRITE-PERMISSION FLAG | WRITE CONTENT |
|---|---|---|
| MODEL NAME : ○○ | - | |
| TYPE : ○○ | - | |
| VERSION INFORMATION : Ver.1 | ON | VERSION INFORMATION : Ver.2 |
| VERSION INFORMATION : Ver.2 | | |
| VERSION INFORMATION : Ver.3 | | |
| STATION TYPE : OCCUPY ONE STATION | OFF | |
| STATION TYPE : OCCUPY TWO STATIONS | | |
| OPERATION SPECIFICATIONS 1 OF THE FA DEVICE | - | |
| OPERATION SPECIFICATIONS 2 OF THE FA DEVICE | - | |
| ⋮ | | |
| ⋮ | | |

| COMMUNICATION SETTING INFORMATION | WRITE-PERMISSION FLAG | WRITE CONTENT |
|---|---|---|
| ⋮ | | |
| ⋮ | | |

CANCEL   OK

FA-DEVICE-CONFIGURATION-DESIGN SUPPORTING APPARATUS AND PROGRAM

FIELD

The present invention relates to an FA-device-configuration-design supporting apparatus and an FA-device-configuration-design supporting program.

BACKGROUND

An FA (Factory Automation) system is configured by connecting a variety of devices. Setting is necessary for the respective devices. Ranges of the setting are different between the devices. Therefore, a user needs to perform the setting for each of the devices. As a mechanism for defining the setting range for each of the devices, a technology of profile is proposed (see, for example, Patent Literature 1).

In a profile, a model name of an FA device, operation specifications of the device, communication setting information, and the like are described. The profile is created by a device vendor, captured into an FA-device-configuration-design supporting apparatus, and used. The profile provided from the device vendor conventionally cannot be edited by a user.

CITATION LIST

Patent Literature

Patent Literature 1: Japanese Patent Application Laid-Open No. 2011-186607

SUMMARY

Technical Problem

Incidentally, when a user designs the configurations of FA devices, usually, setting values used by the user for the same FA device are determined in advance. Therefore, for the respective FA devices, every time the user uses profiles of the FA devices, the user needs to designate, out of setting ranges defined by the profiles, setting values that the user desires to use. As a result, there is a problem in that a lot of labor of the user is required until setting of all the FA devices is completed. It is also likely that the user forgets setting of the FA devices or makes a setting mistake.

The present invention has been devised in view of the above and it is an object of the present invention to obtain an FA-device-configuration-design supporting apparatus and an FA-device-configuration-design supporting program that enables addition of setting values for each user to a profile and can use setting values of a profile defined by the user (hereafter referred to as user-defined profile) as default values.

Solution to Problem

There is provided an FA-device-configuration-design supporting apparatus according to an aspect of the present invention that performs editing of a profile including individual identification information and a definition of setting of an FA device and a setting range of the setting, the FA-device-configuration-design supporting apparatus including: a profile storing unit that stores the profile; a user-specific-information-region securing unit that secures, for the profile in the profile storing unit, a write-content input region in which a setting value specific to a user can be written concerning content defined in the profile; a user-specific-information writing unit that writes, in the write-content input region, the content defined in the profile edited by a first user; and a user-specific-information saving unit that saves, as a user-defined profile, in the profile storing unit, the profile including the content input to the write-content input region.

Advantageous Effects of Invention

According to the present invention, setting information in the profile is customized by the user, the user-defined profile is created, and the user-defined profile can also be used in performing setting of the same FA device next. Therefore, there is an effect that, for the same FA device, it is possible to facilitate setting of the FA device and reduce setting man-hours of the FA devices. Further, because the customized user-defined profile is used, parts to be changed by the user decreases. There is an effect that it is also possible to realize a setting mistake reduction.

BRIEF DESCRIPTION OF DRAWINGS

FIGS. 10(a) and 10(b) are diagrams showing examples of design screens for FA devices before and after saving of a user-defined profile.

FIG. 11 is a diagram showing an example of a setting screen for performing export of a profile of an FA device.

DESCRIPTION OF EMBODIMENTS

An FA-device-configuration-design supporting apparatus and an FA-device-configuration-design supporting program according to an embodiment of the present invention are explained in detail below with reference to the accompanying drawings. Note that the present invention is not limited by the embodiment.

Figure 1:
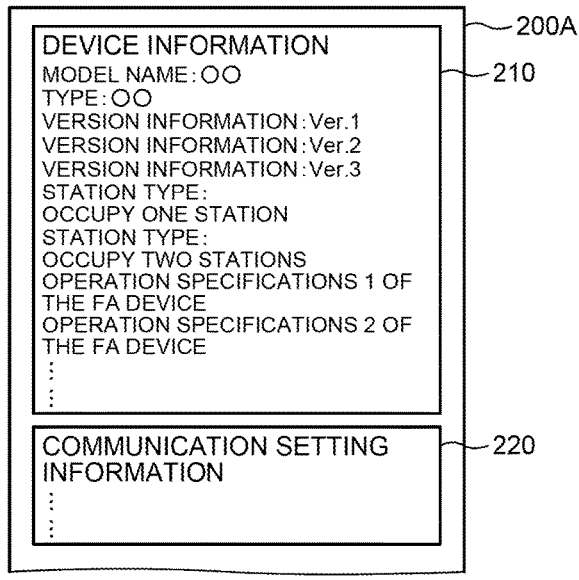
FIGS. 1(a) and 1(b) are diagrams showing an example of profiles.

FIG. 1 is a diagram showing profiles. FIG. 1(a) is a diagram showing an example of a general profile. FIG. 1(b) is a diagram showing an example of a user-defined profile used in this embodiment. A profile 200A is a file (information) in which individual identification information of an FA device, a definition of setting of the FA device, and a setting range of the setting. As shown in FIG. 1(a), the profile 200A includes device information 210 and communication setting information 220.

The device information 210 includes a model name, a type, version information, a station type, and operation specifications of the FA device. The communication setting information 220 includes information for identifying a communication interface, specification information of the communication network, information concerning inputs and outputs of the communication interface, information of parameters concerning setting of the communication interface, and command information of the communication interface. In the general profile 200A, setting values (or a setting range) are set for these items by a device vendor. These setting values (or a setting range) are fixed values that cannot be edited by a user.

On the other hand, as shown in FIG. 1(b), in a user-defined profile 200B used in this embodiment, a write-permission flag attribute 232 and a write content attribute 233 are added to the items of the general profile shown in FIG. 1(a) and an initial setting value 231, which is setting values (setting ranges) set in advance by a vendor of the FA device. The write-permission flag attribute 232 indicates whether writing by the user is possible concerning the initial setting value 231 defined with respect to the items in the profile. In this example, values that the write-permission flag attribute 232 can take are three kinds of a first flag "–", a second flag "OFF", and a third flag "ON". In the write content attribute 233, when the write-permission flag attribute 232 is "ON", a setting value for an item, the write-permission flag attribute 232 of which is "ON", is written.

When the write-permission flag attribute 232 is "OFF", as in the past, information described in the profile is set as a default value of the FA device. When the write-permission flag attribute 232 is "ON", a setting value input to the write content attribute 233 is set as a default value of the FA device. Information, the write-permission flag attribute 232 of which is "–", indicates that the information is a specific name, an invariable value, or the like and is not a value to be set by the user. Note that, in this example, values that the write-permission flag attribute 232 can take is "OFF", "ON", and "–". However, types of attribute values can also be added.

The write-permission flag attribute 232 and the write content attribute 233, in which the values defined by the user are written, are user specific information. The user-defined profile is a combination of the original profile and the user specific information.

The profile 200A can be edited by the user in this way. Consequently, it is possible to store, as the user-defined profile, setting values set within a definition range concerning a certain FA device and copy and use the stored user-defined profile for other FA devices of the same type. That is, the profile in this embodiment is a file created by a device vendor. The file defines setting of the FA device and a setting range of the setting. The user can customize the profile within the defined range when the user uses the profile.

Figure 2:
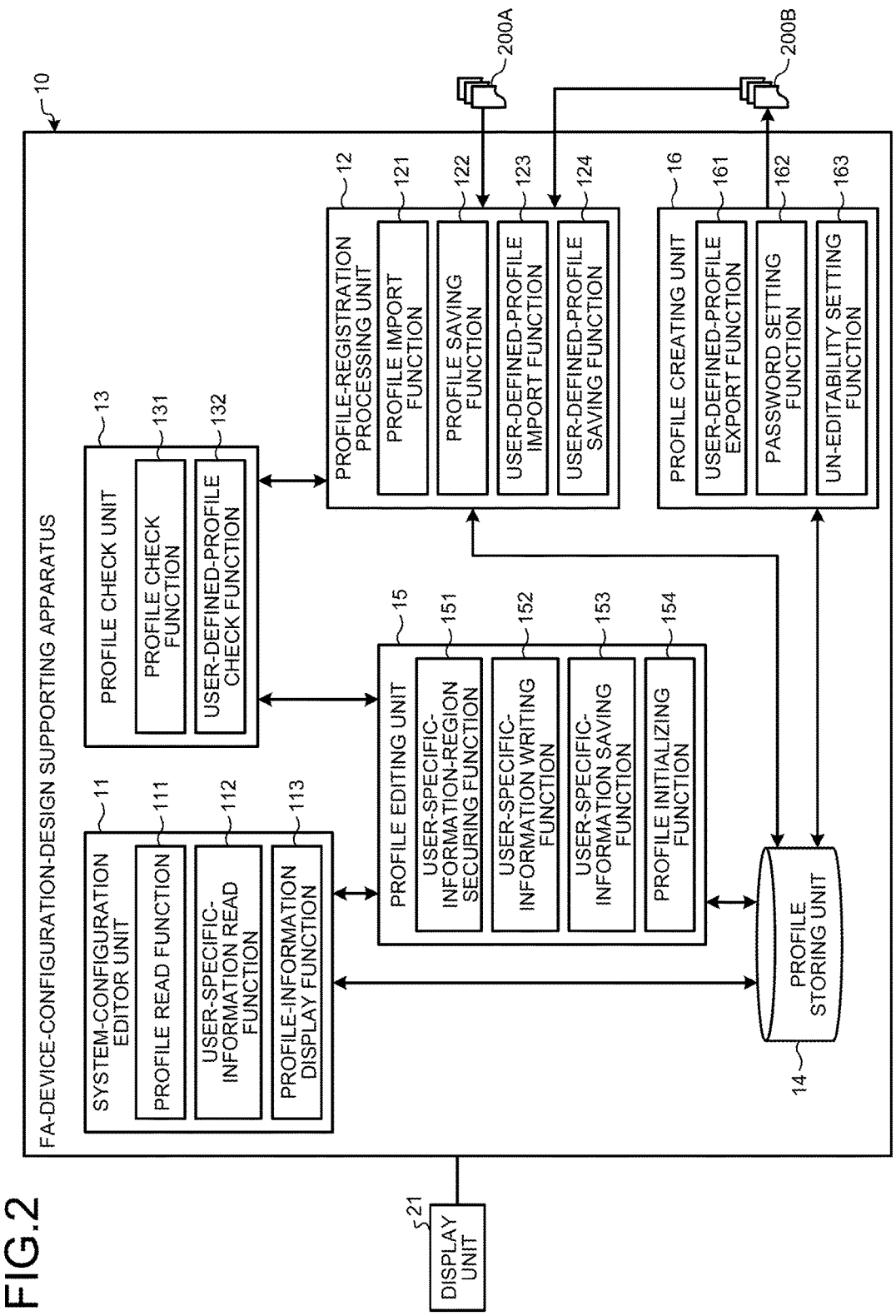
FIG. 2 is a block diagram schematically showing an example of the configuration of an FA-device-configuration-design supporting apparatus according to an embodiment.

FIG. 2 is a block diagram schematically showing an example of the configuration of the FA-device-configuration-design supporting apparatus according to this embodiment. An FA-device-configuration-design supporting apparatus 10 includes a system-configuration editor unit 11, a profile-registration processing unit 12, a profile check unit 13, a profile storing unit 14, a profile editing unit 15, and a profile creating unit 16. A display unit 21 such as a monitor, which displays information, is connected to the FA-device-configuration-design supporting apparatus 10.

The system-configuration editor unit 11 is a graphical user interface that reads out a profile or a user-defined profile and causes the display unit 21 to display the profile or the user-defined profile. The system-configuration editor unit 11 includes a profile read function 111, a user-specific-information read function 112, and a profile-information display function 113.

The profile read function 111 reads out, from the profile storing unit 14, a profile or a user-defined profile of an FA device registered in the profile storing unit 14.

The user-specific-information read function 112 reads out, from the profile storing unit 14, FA device information specific to the user (user specific information) written in write content, which can be written anew, with respect to the registered user-defined profile. In the user-defined profile, when the write-permission flag attribute 232 of a setting value of the FA device is "ON", information of the write content attribute 233 is read out as a setting value (a default value) of the FA device. When the write-permission flag is "OFF" or "–", the initial setting value 231 is read out. The user-specific-information read function 112 corresponds to the user-specific-information read unit.

The profile-information display function 113 displays, on the display unit 21, information read out by the profile read function 111 or the user-specific-information read function 112. The user performs setting of the FA device via this interface. Note that, in this embodiment, the FA device indicates a programmable controller (PLC), a display, a numerical control (NC), field devices (a sensor, a valve, a motor, a servo amplifier, an inverter, a robot, etc.), and the like, which are components of a control system.

The profile-registration processing unit 12 includes a profile import function 121, a profile saving function 122, a user-defined-profile import function 123, and a user-defined-profile saving function 124.

The profile import function 121 captures one or a plurality of profile created by a device vendor into the FA-device-configuration-design supporting apparatus 10. The profile saving function 122 saves information of the profile in the profile storing unit 14.

The user-defined-profile import function 123 captures one or a plurality of user-defined profiles from an external storage device. The user-defined-profile import function 123 corresponds to the user-defined-profile import unit. The user-defined-profile saving function 124 saves the user-defined profile in the profile storing unit 14.

The profile check unit 13 includes a profile check function 131 and a user-defined-profile check function 132.

The profile check function 131 performs a check of a profile format and a check of a profile structure on a profile imported from the external storage device. As the check of the profile format, the profile check function 131 checks, for example, whether prohibited characters are included in the profile, whether a maximum number of input characters is exceeded, and whether there is any part where a setting value is not set. As the check of the profile structure, the profile check function 131 checks, for example, whether the profile structure corresponds to specifications and whether the profile is broken. As a result of the checks, when there is a problem, the profile check function 131 displays an error message on the display unit 21 and does not perform (stops) import of the profile.

The user-defined-profile check function 132 performs a check of a profile format, a check of a profile structure, and a password check on the user-defined profile. As the check of the profile format, the user-defined-profile check function 132 checks, for example, whether prohibited characters are included in the user-defined profile, whether a maximum number of input characters is exceeded, and whether an unset value is present. As the check of the profile structure, the user-defined-profile check function 132 checks, for example, whether the profile structure corresponds to specifications and whether the user-defined profile is broken. The user-defined-profile check function 132 may check whether a setting value input by the user is within a setting range set by a profile serving as a base. As a result of these checks, when there is a problem, the user-defined-profile check function 132 displays an error message on the error-message display unit 21 and does not perform import of the user-defined profile.

As the password check, the user-defined-profile check function 132 checks, when a read password is given to the user-defined profile, whether a password input by the user coincides with the read password registered in the user-defined profile. When the input read password is wrong, the user-defined-profile check function 132 displays an error message on the display unit 21 and requests an input of a password again. When password input mistakes occur a predetermined number of times, for example, it is possible to not to perform import of the user-defined profile. The user-defined-profile check function 132 corresponds to the user-defined-profile check unit.

The profile storing unit 14 stores the profile and the user-defined profile. The profile storing unit 14 corresponds to the profile storing unit.

The profile editing unit 15 includes a user-specific-information-region securing function 151, a user-specific-information writing function 152, a user-specific-information saving function 153, and a profile initializing function 154.

The user-specific-information-region securing function 151 secures, when the user attempts to edit any one of a setting value and a setting range of a profile and parameters of an FA device, a write-content-attribute input region, in which a setting value specific to the user can be written, and a write-permission-flag-attribute input region with respect to the editing target profile. That is, as shown in FIG. 1(b), the user-specific-information-region securing function 151 secures, with respect to each item of the profiles, besides the initial setting value 231, a write-permission-flag-attribute input region in which the write-permission flag attribute 232 is input and a write-content-attribute input region in which the write content attribute 233 is input. The user-specific-information-region securing function 151 corresponds to the user-specific-information-region securing unit.

When the user edits any one of a setting value and a setting range of a profile and parameters of an FA device, the user-specific-information writing function 152 performs processing for changing the write-permission flag attribute 232 and the write content attribute 233 according to the editing by the user. An initial value of the write-permission flag attribute 232 of a user-defined profile is "OFF" or "–". "–" indicates that the initial value is a value that the user cannot set such as a specific name of the FA device or an invariable value. Therefore, in the case of writing in the write content attribute 233, the corresponding write-permission flag attribute 232 of which is "–", the user-specific-information writing function 152 does not permit the editing by the user. In the case of writing in the write content attribute 233, the corresponding write-permission flag attribute 232 of which is "OFF", the user-specific-information writing function 152 performs processing for switching the write-permission flag attribute 232 from "OFF" to "ON" and performs writing in the write content attribute 233 of the content edited by the user. The user-specific-information writing function 152 corresponds to the user-specific-information writing unit.

The user-specific-information saving function 153 saves, as a user-defined profile, in the profile storing unit 14, a profile including the write content attribute 233 edited by the user and the write-permission flag attribute 232 changed by the user-specific-information writing function 152. Note that, in the saving, the user may be able to select whether the user-defined profile is overwritten on the original profile and saved, or the user-defined profile is saved as another file.

When the user desires to return a setting value of a profile to a state at a time point of provision by the device vendor with respect to a user-defined profile, that is, desires to perform initialization, the profile initializing function 154 reads out the initial setting value 231 from the user-defined profile 200B, and the system-configuration editor unit 11 causes the display unit 21 to display the initial setting value. When the user instructs the initialization, the profile initializing function 154 initializes the user-defined profile using the read-out initial setting value. In this case, the profile initializing function 154 initializes, for example, the write-permission flag attribute 232 of the user-defined profile 200B and clears input contents of the write content attribute 233. The profile initializing function 154 corresponds to the profile initializing unit.

The profile creating unit 16 includes a user-defined-profile export function 161, a password setting function 162, and an un-editability setting function 163.

The user-defined-profile export function 161 reads out one or a plurality of user-defined profiles stored in the profile storing unit 14 and discharges the user-defined profile(s) to the external storage device. The user-defined-profile export function 161 corresponds to the user-defined-profile export unit.

When a user-defined profile is exported by the user-defined-profile export function 161, the password setting function 162 sets a read password with respect to the user-defined profile. The password setting function 162 corresponds to the password setting unit.

When, in the user-defined profile exported by the user-defined-profile export function 161, there is a setting value that the user exporting the user-defined profile does not desire other users to edit, the un-editability setting function 163 performs, on the setting value, un-editability setting during writing. That is, the un-editability setting function 163 sets a state of a write-permission flag to "–" concerning the setting value selected by the exporting user. The un-editability setting function 163 corresponds to the un-editability setting unit.

In the FA-device-configuration-design supporting apparatus 10 having such a configuration, editing processing for setting values of a profile, initialization processing for a user-defined profile, export processing for the user-defined profile, and import processing for the user-defined profile are performed. In the following explanation, these kinds of processing are explained.

<Editing Processing for Setting Values of a Profile>

Figure 3:
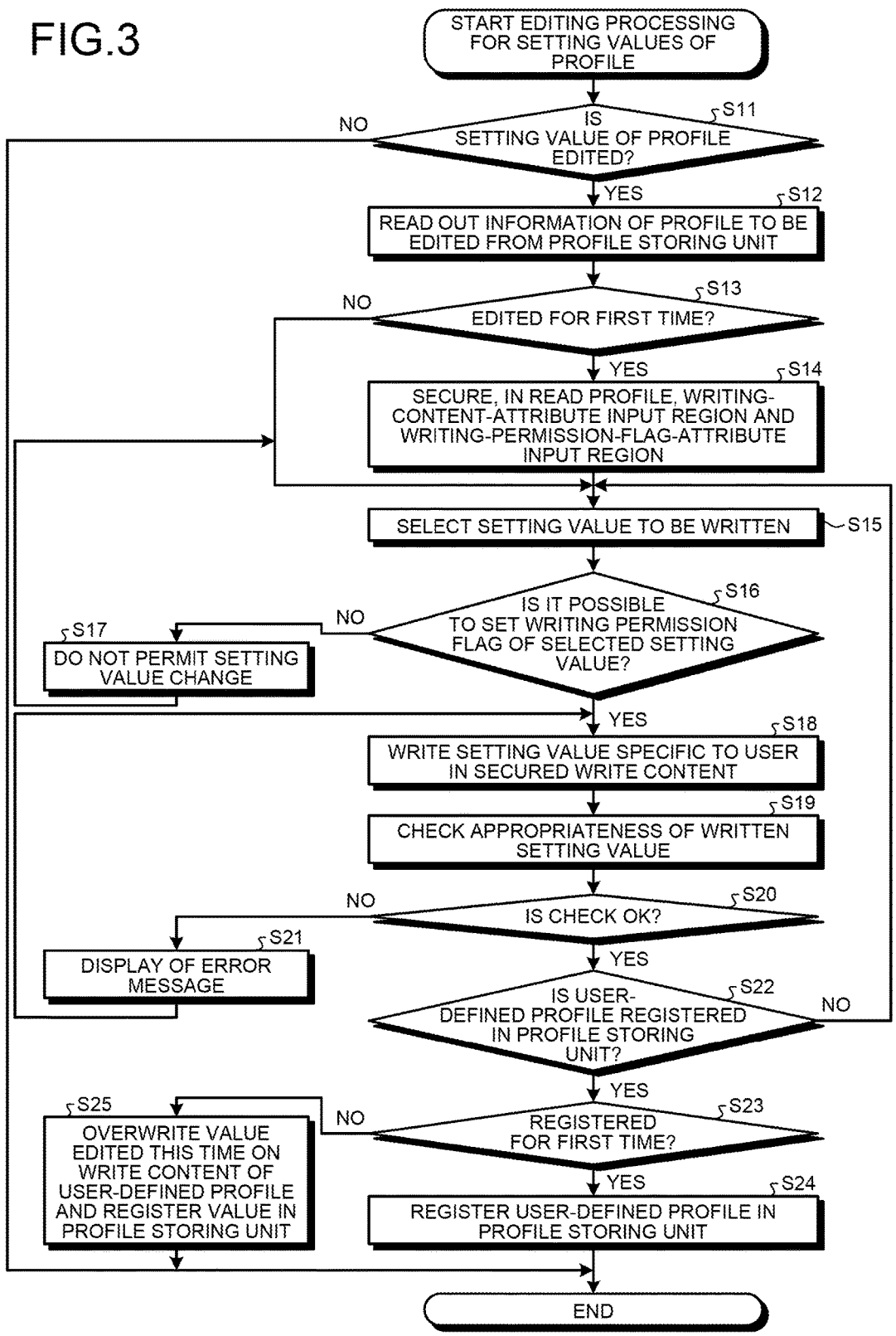
FIG. 3 is a flowchart showing an example of a procedure of editing processing for setting values of a profile in the FA-device-configuration-design supporting apparatus according to the embodiment.

FIG. 3 is a flowchart showing an example of a procedure of the editing processing for setting values of a profile in the FA-device-configuration-design supporting apparatus according to the embodiment. First, the profile read function 111 of the system-configuration editor unit 11 checks whether setting values of a profile are edited (step S11). For example, the profile read function 111 determines whether the editing processing for the setting values of the profile is instructed by the user. When the setting values of the profile are not edited (NO at step S11), the processing ends.

When the setting values of the profile are edited (Yes at step S11), the profile read function 111 of the system-configuration editor unit 11 reads out information of the profile to be edited from the profile storing unit 14 (step S12). For example, this is performed when profiles in the profile storing unit 14 are displayed on the display unit 21 as a list and the user selects a profile to be edited out of the profiles.

Subsequently, the profile read function 111 determines whether the read profile is edited for the first time or the second or subsequent time (step S13). When a profile is read, the profile read function 111 can determine that the read profile is edited for the first time. When a user-defined profile is read, the profile read function 111 can determine that the read profile is edited for the second or subsequent time. When the read profile is edited for the first time (Yes at step S13), the user-specific-information-region securing function 151 of the profile editing unit 15 secures, in the read profile, a write-content-attribute input region and a write-permission-flag-attribute input region (step S14).

Thereafter, when the profile is edited for the second or subsequent time (No at step S13), a setting value to be written in the profile anew is selected by the user (step S15). The user-specific-information writing function 152 of the profile editing unit 15 determines whether a change of a write-permission flag attribute corresponding to the setting value written by the user (change of the flag from OFF to ON) is possible (step S16).

When the change of the write-permission flag attribute of the selected setting value cannot be performed (No at step S16), the user-specific-information writing function 152 does not admit the change of the setting value (step S17) and the processing returns to step S15.

On the other hand, when the change of the write-permission flag attribute of the selected setting value can be performed (Yes at step S16), the user-specific-information writing function 152 of the profile editing unit 15 write, in secured write content, the setting value specific to the user set by the user (step S18).

Thereafter, the user-defined-profile check function 132 of the profile check unit 13 performs a check of a profile format, for example, checks whether prohibited characters are included, whether a maximum number of input characters is exceeded, and there is any part where a setting value is not set with respect to the setting value written in the write content (step S19). The user-defined-profile check function 132 determines whether there is no problem in a check result of the profile format (step S20).

When there is a problem in the check result (No at step S20), the user-defined-profile check function 132 displays an error message on the display unit 21 (step S21) and processing returns to step S18. When there is no problem in the check result (Yes at step S20), the user-specific-information saving function 153 of the profile editing unit 15 checks whether a user-defined profile is to be registered in the profile storing unit 14 (step S22). This is determined according to whether registration is instructed by the user. When the registration is not performed (No at step S22), the processing returns to step S15.

When the registration is performed (Yes at step S22), the user-specific-information saving function 153 determines whether the registration of the user-defined profile is performed for the first time or the second or more time (step S23). When the registration of the user-defined profile is performed for the first time (Yes at step S23), the user-specific-information saving function 153 registers the user-defined profile in the profile storing unit 14 (step S24) and the processing ends.

When the registration is performed for the second or more time (No at step S23), the user-specific-information saving function 153 overwrites the setting value written in the write content of the user-defined profile this time on the user-defined profile already stored in the profile storing unit 14 and registers the user-defined profile in the profile storing unit 14 (step S25). Consequently, the editing processing for the setting values of the profile ends.

When the processing explained above is performed, from the next time onward, when the user-defined profile is used, the setting value written this time is displayed in default in the system-configuration editor unit 11.

<Initialization Processing for a User-Defined Profile>

Figure 4:
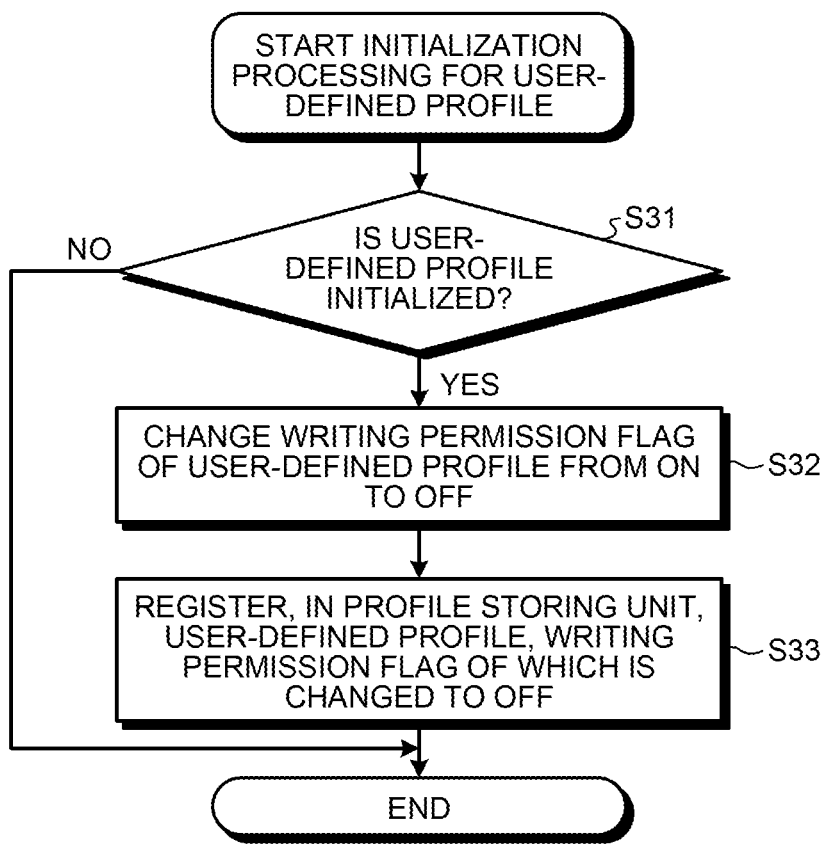
FIG. 4 is a flowchart showing an example of a procedure of initialization of a user-defined profile according to the embodiment.

FIG. 4 is a flowchart showing an example of a procedure of initialization of a user-defined profile according to this embodiment. First, the profile initializing function 154 of the profile editing unit 15 checks whether an instruction for initializing a user-defined profile is received from the user (step S31). That is, the profile initializing function 154 checks presence or absence of an instruction for returning a setting value of the user-defined profile to a state at the time of provision by the device vendor. When the instruction for initializing the user-defined profile is not received (No at step S31), the profile initializing function 154 performs no processing and the processing ends.

On the other hand, when the instruction for initializing the user-defined profile is received (Yes at step S31), the profile initializing function 154 changes all write-permission flags of the initialization target user-defined profile registered in the profile storing unit 14 from ON to OFF (step S32) and performs processing for returning the user-defined profile to an initial setting value. Thereafter, the profile initializing function 154 registers the initialized user-defined profile in the profile storing unit 14 (step S33). Thus, the processing ends.

<Export Processing for a User-Defined Profile>

Figure 5:
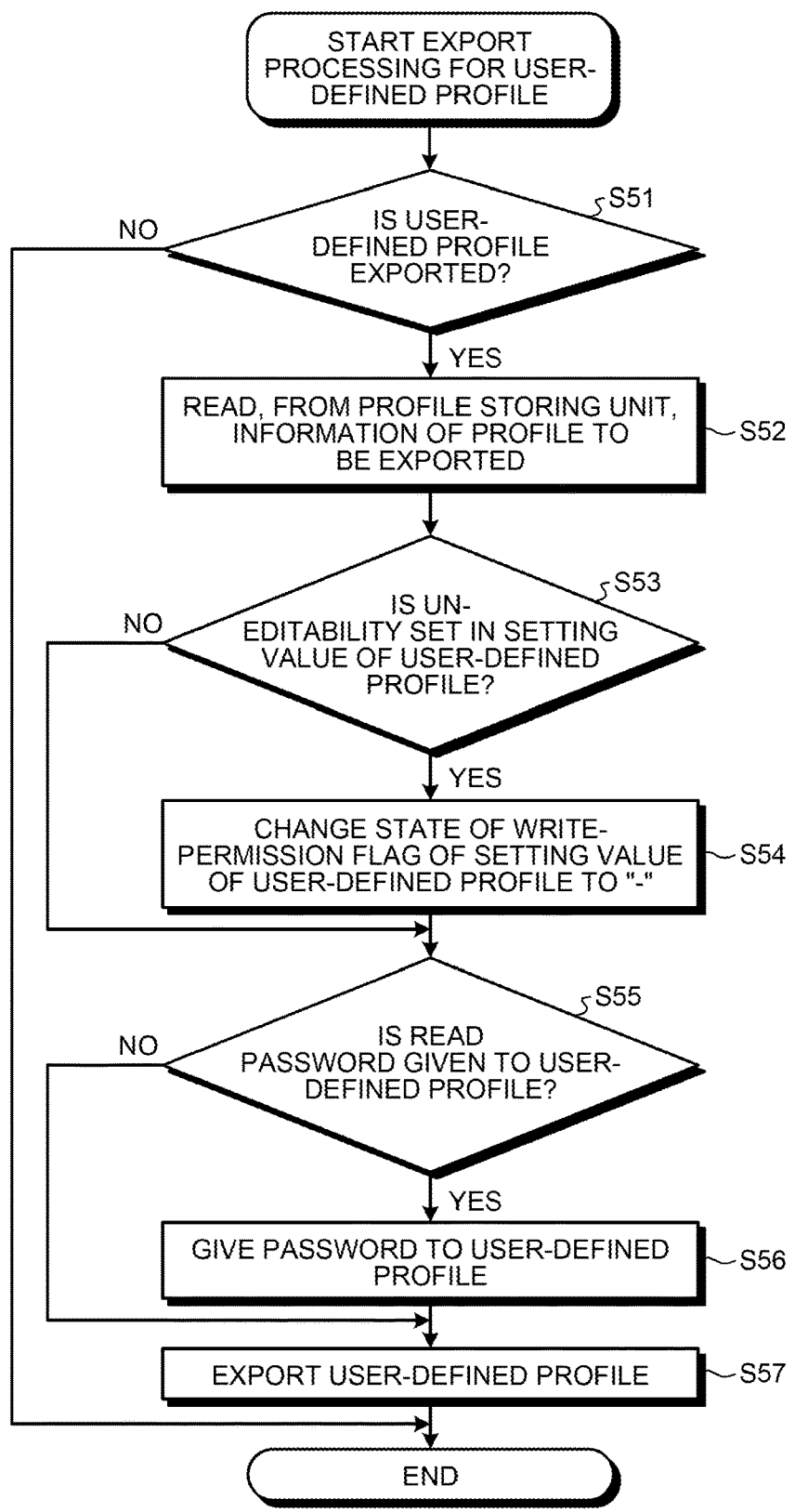
FIG. 5 is a flowchart showing an example of a procedure of export processing for a user-defined profile according to the embodiment.

FIG. 5 is a flowchart showing an example of a procedure of export processing for a user-defined profile according to this embodiment. First, the user-defined-profile export function 161 of the profile creating unit 16 checks whether an instruction for exporting a user-defined profile to the external storage device is received (step S51). When the instruction for exporting the user-defined profile is not received (No at step S51), the user-defined-profile export function 161 performs no processing and the processing ends.

On the other hand, when the instruction for exporting the user-defined profile is received (Yes at step S51), the user-defined-profile export function 161 reads out, from the profile storing unit 14, information of the user-defined profile to be executed (step S52).

Subsequently, the user-defined-profile export function 161 checks with the user whether un-editability is set for a setting value of the user-defined profile during writing in the setting value (step S53). When the setting of the un-editability is performed (Yes at step S53), the exporting user (the user currently performing the editing processing) changes a value of a write-permission flag attribute of a setting value that the user does not desire other users to edit from "ON" or "OFF" to "–". The un-editability setting function 163 of the profile creating unit 16 performs processing for reflecting content of the change (step S54).

Thereafter, or when the setting of the un-editability is not performed at step S53 (No at step S53), the un-editability setting function 163 checks with the user whether a read password is given to the user-defined profile (step S55). When the read password is given (Yes at step S55), the password setting function 162 of the profile creating unit 16 gives the password to the user-defined profile according to an input from the user (step S56).

Thereafter, or when the read password is not given to the user-defined profile at step S55 (No at step S55), the user-defined-profile export function 161 of the profile creating unit 16 exports the user-defined profile to the external storage device (step S57) and ends the processing.

<Import Processing for a User-Defined Profile>

Figure 6:
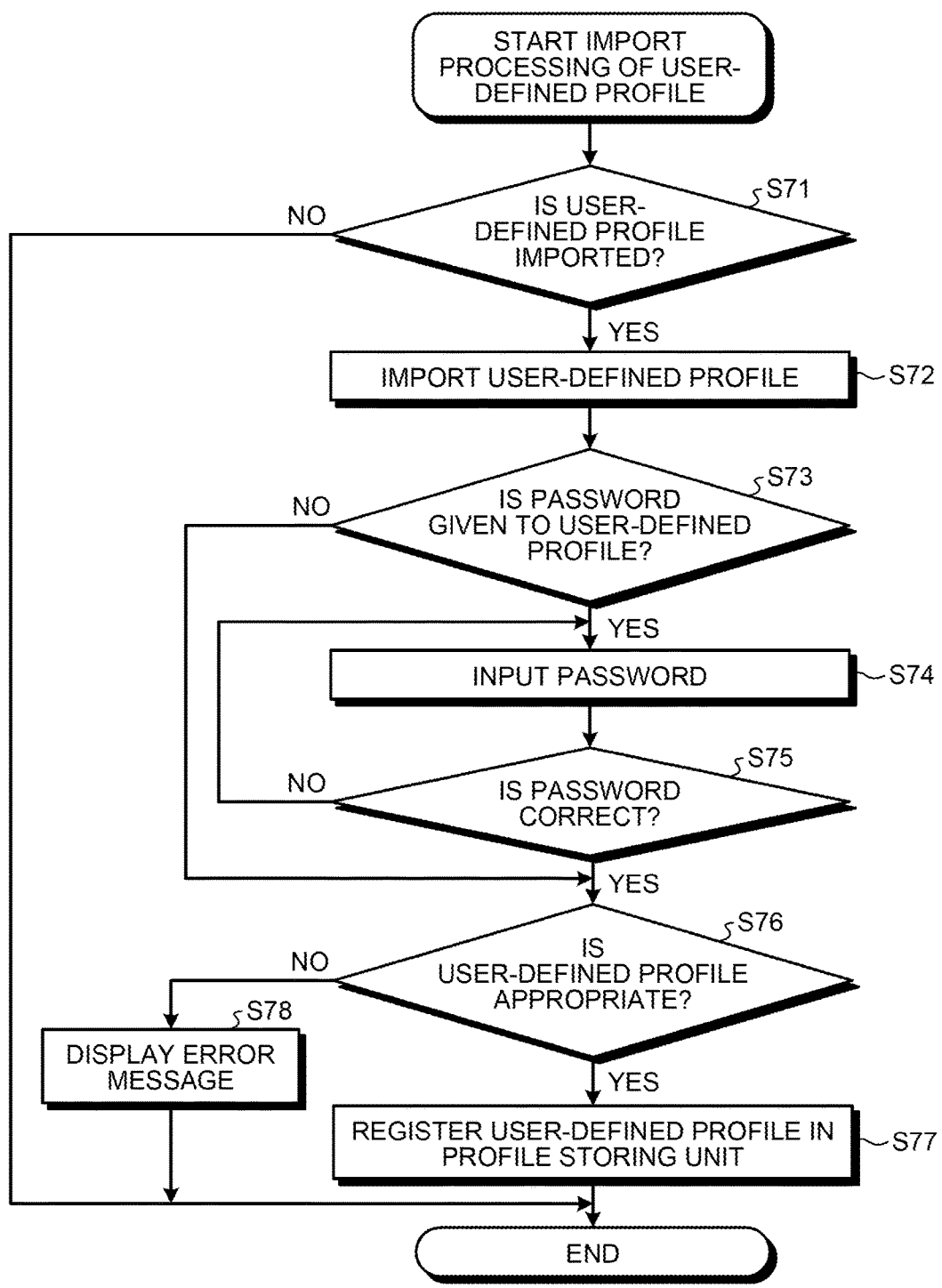
FIG. 6 is a flowchart showing an example of import processing for a user-defined profile according to the embodiment.

FIG. 6 is a flowchart showing an example of a procedure of import processing for a user-defined profile according to this embodiment. First, the user-defined-profile import function 123 of the profile-registration processing unit 12 checks whether an instruction for importing a user-defined profile is received from the external storage device (step S71). When the instruction for importing a user-defined profile is not received (No at step S71), the user-defined-profile import function 123 performs no processing and the processing ends.

On the other hand, when the instruction for importing a user-defined profile is received (Yes at step S71), the user-defined-profile import function 123 imports a user-defined profile from the external storage device (step S72).

Thereafter, the user-defined-profile check function 132 of the profile check unit 13 checks whether a read password is given to the user-defined profile (step S73). When the read password is given to the user-defined profile (Yes step S73), the user-defined-profile check function 132 displays a password input screen on the display unit 21 and receives an input of a password input by the user (step S74).

Subsequently, the user-defined-profile check function 132 checks whether the input password coincides with a read password set in the user-defined profile (step S75). When the password does not coincide with the read password (No at step S75), the user-defined-profile check function 132 returns to step S74 and requests the user to input a correct password. Note that the user-defined-profile check function 132 may count the number of times the correct password is not input. When the correct password is not input continuously a predetermined number of times, the user-defined-profile check function 132 can end the import processing.

When the password is correct (Yes at step S75) or when a password is not given to the user-defined profile at step S73 (No at step S73), the user-defined-profile check function 132 checks whether the imported user-defined profile is appropriate (step S76). Specifically, the user-defined-profile check function 132 performs a profile structure check for checking whether the imported user-defined profile corresponds to specifications and is not broken.

When the user defined profile is appropriate (Yes at step S76), the user-defined-profile saving function 124 of the profile-registration processing unit 12 registers the user-defined profile in the profile storing unit 14 (step S77) and the processing ends.

When the user-defined profile is inappropriate at step S76 (No at step S76), the user-defined-profile check function 132 displays an error message on the display unit 21 (step S78) and does not perform the import processing and the processing ends.

Figure 7:
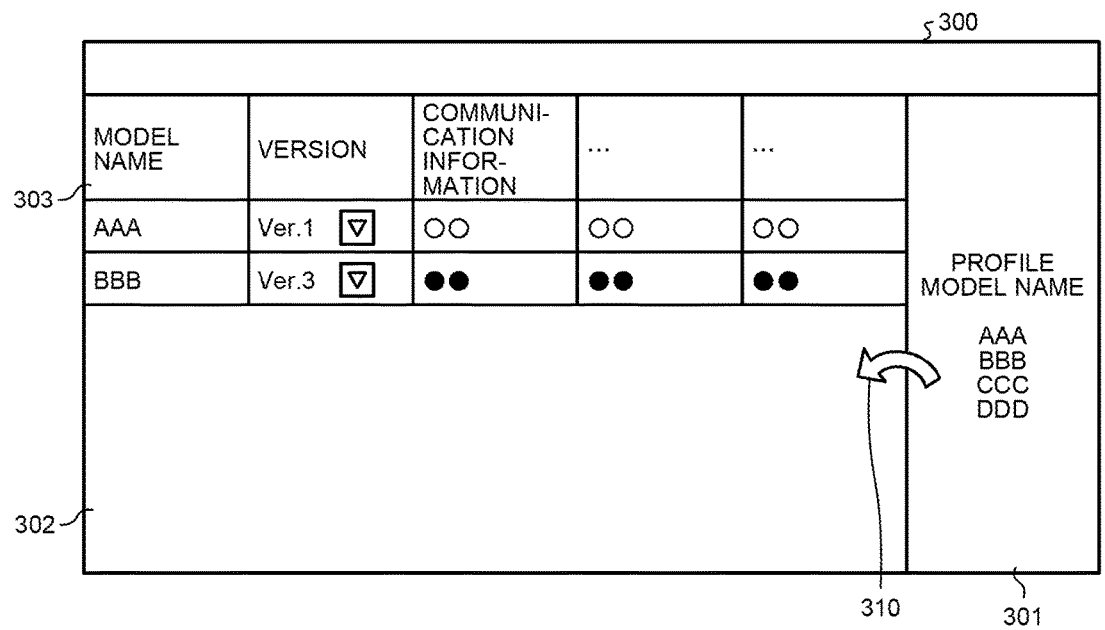
FIG. 7 is a diagram showing an example of a design screen for FA devices.

An operation method for the FA-device-configuration-design supporting apparatus 10 is explained with reference to a specific example. FIG. 7 is a diagram showing an example of a setting screen for FA devices. A design screen 300 includes a profile-model-name display region 301 and a configuration-diagram display region 302. The profile-model-name display region 301 displays, for example, in a list form, model names of profiles of FA devices to be designed. The configuration-diagram display region 302 displays content 303 of profiles of model names selected by the user out of the profile-model-name display region 301. The content 303 of model names "AAA" and "BBB" in the profile-model-name display region 301 is displayed. The display in the configuration-diagram display region 302 is performed by, for example, the user dragging and dropping 310 a model name displayed in the profile-model-name display region 301 to the configuration-diagram display region 302. By performing this operation, the contents (the individual identification information and the definition of the setting of the unit) of the profiles shown in FIGS. 1(a) and 1(b) are displayed in a configuration diagram.

Figure 8:
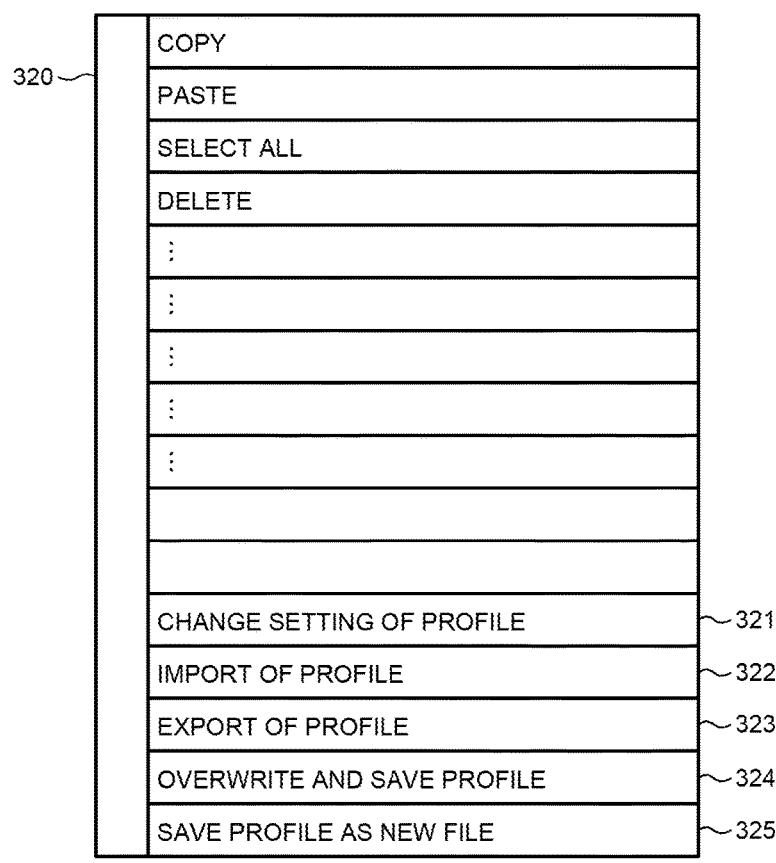
FIG. 8 is a diagram showing an example of an image of menu display at the time when editing for a profile of an FA device is performed.

The editing processing for setting values of a profile, initialization processing for a user-defined profile, the export processing for the user-defined profile, and the import processing for the user-defined profile explained above are performed on the content 303 of the configuration-diagram display region 302 in FIG. 7. FIG. 8 is a diagram showing an example of an image of menu display at the time when editing for a profile of an FA device is performed. When the user desires to perform editing of a profile, the user selects a profile displayed in the content 303 of the configuration-diagram display region 302, for example, with a mouse and right-clicks the profile. Then, a menu 320 shown in FIG. 8 is displayed on the display unit 21. The menu 320 includes items such as "change setting of the profile" 321, "import of the profile" 322, "export of the profile" 323, "overwrite and save the profile" 324, and "add name to the profile and save the profile" 325.

For example, when the user selects the "change setting of the profile" 321, a profile definition dialog explained below with which setting of the profile can be performed is displayed. When the user selects the "import the profile" 322, an import check dialog explained below concerning import of the profile is displayed. When the user selects the "export the profile" 323, a security setting dialog explained below with which export of the profile can be performed is displayed.

Figure 9:
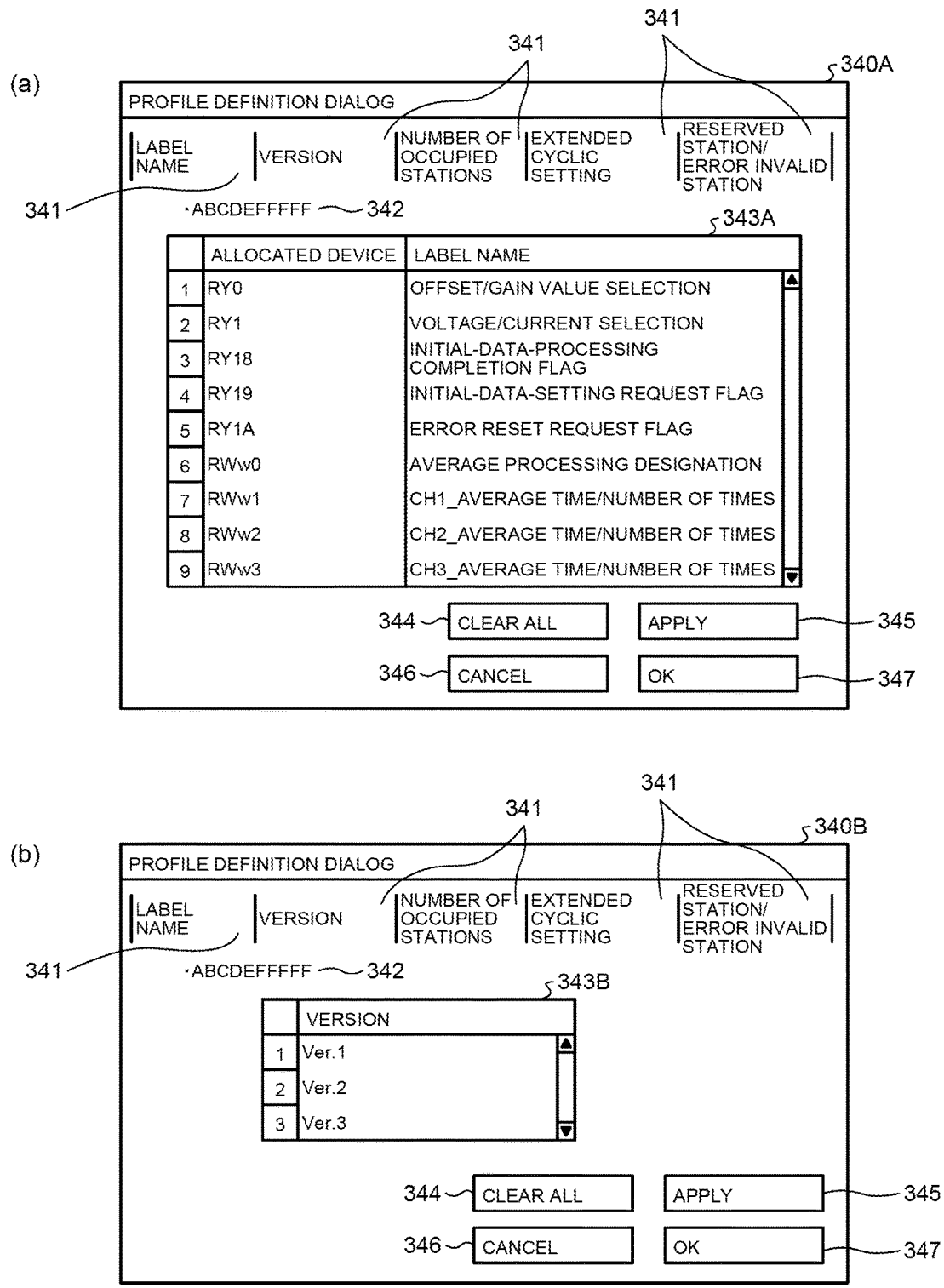
FIGS. 9(a) and 9(b) are diagrams showing an example of a setting screen for performing a setting change of the profile.

FIG. 9 is a diagram showing an example of a setting screen for performing a setting change of the profile. When the user selects the item "change setting of the profile" 321 in FIG. 8, profile definition dialogs 340A and 340B shown in FIG. 9 are opened. In this example, each of the profile definition dialogs 340A and 340B includes tabs 341 for each of categories. Setting items and setting contents included in the category of the tab 341 selected by the user concerning a selected model name 342 are displayed in content display regions 343A and 343B in a form of editing cells. Contents displayed in the editing cells are editable. Definition values of the contents can be edited.

On lower sides of the profile definition dialogs 340A and 340B, respectively, buttons for determining, for example, whether edited content is to be saved or not such as an "all clear" button 344, an "apply" button 345, a "cancel" button 346, and an "OK" button 347 are disposed.

In FIG. 9(a), an example of the profile definition dialog 340A at the time when a "label name" tab is selected is shown. In FIG. 9(b), an example of the profile definition dialog 340B at the time when a "version" tab is selected is shown. The user performs editing of a setting value of a profile in the profile definition dialogs 340A and/or 340B, presses the "apply" button 345, and further presses the "OK" button 347, whereby a user-defined profile is created.

When the user desires to perform initialization, the user presses the "all clear" button 344. Then, the profile can be returned to the profile in an unedited state according to the processing in the flowchart shown in FIG. 4.

By pressing the "cancel" button 346, the user can suspend the editing processing and close the profile definition dialogs 340A and 340B. In this case, definition values edited before the "cancel" button 346 is pressed are not reflected on the profile.

FIG. 9(b) is the profile definition dialog 340B at the time when the "version" is selected as a category. In the past, when a profile with the model name 342 is used, Ver. 1 is always displayed in default as version information. On the other hand, in this embodiment, in the profile definition dialog 340B shown in FIG. 9(b), the user selects, Ver. 2, presses the "apply" button 345, and further presses the "OK" button 347, for example. Then, when the user uses the profile indicated by the model name 342 next time, content of Ver. 2 is always displayed in default as version information.

FIG. 10 is a diagram showing examples of design screens for a FA device before and after saving of a user-defined profile. FIG. 10(a) shows the example of the design screen for the FA device before the saving of the user-defined profile. It is assumed that the user selects a profile 510 in a design screen 500, changes version information 511 from an initial setting value "Ver. 1" to "Ver. 3", and saves the version information 511. FIG. 10(b) shows the example of the design screen for the FA device after the saving of the user-defined profile. As shown in the figure, on the design screen 500, in addition to the source profile 510 at a diversion source, an edited user-defined profile 520 is also saved. Version information 521 of the user-defined profile 520 is "Ver. 3". In the past, only initial setting values of a profile were displayed. However, in the embodiment, concerning items, write-permission flag attributes of which are changed to "ON" by the editing processing, contents set in the write content attribute 233 are displayed.

FIG. 11 is a diagram showing an example of a setting screen for performing export of a profile of an FA device. When the user selects the "export the profile" 323 in the menu shown in FIG. 8, a security setting dialog 360 shown in FIG. 11 is opened. In the security setting dialog 360, a read-password setting region 370, an editing-permission setting region 380, a "cancel" button 391, and an "OK" button 392 are provided.

In the security setting dialog 360, when the user sets a read password, the user checks a checkbox 371 of "set a read password" of the read-password setting region 370 and inputs a password requested at the time of reading a user-defined profile to password input columns 372 and 373.

When there is a setting value that the exporting user does not desire other users to edit, the user checks a checkbox 381 of "set editing permission" of the editing-permission setting region 380 and performs setting of un-editability at a time of writing. As explained above, by setting a state of a write-permission flag attribute to "−" that corresponds to the setting value to be set to un-editability, the user can set the setting value to un-edit ability.

After performing the input to the read-password setting region 370 or the editing-permission setting region 380, when the user presses the "OK" button 392, a user-defined profile in which the read password or the setting of un-editability is reflected is exported. When the user presses the "cancel" button 391, the export processing is suspended and the security setting dialog 360 is closed.

Figure 12:
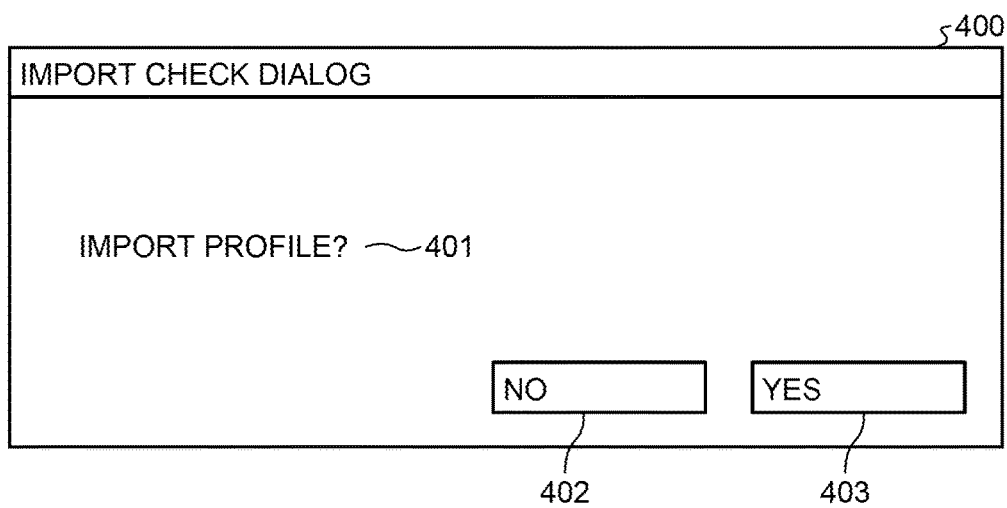
FIG. 12 is a diagram showing an example of an import check dialog.

When the user causes the display unit 21 to display the menu 320 for the profile selected in the design screen 300 for the FA device shown in FIG. 7 and selects the "import the profile" 322, the user can execute import of the profile. FIG. 12 is a diagram showing an example of an import check dialog. In an import check dialog 400, a message 401 for checking with the user whether import of the profile is performed is displayed. A "No" button 402 and a "Yes" button 403, which are responses of the user to the message 401, are provided.

When the user presses the "Yes" button 403, the profile is imported to the FA-device-configuration-design supporting apparatus 10 from the external storage device. When the user presses the "No" button 402, the import processing is suspended and the import of the profile is not performed.

Figure 13:
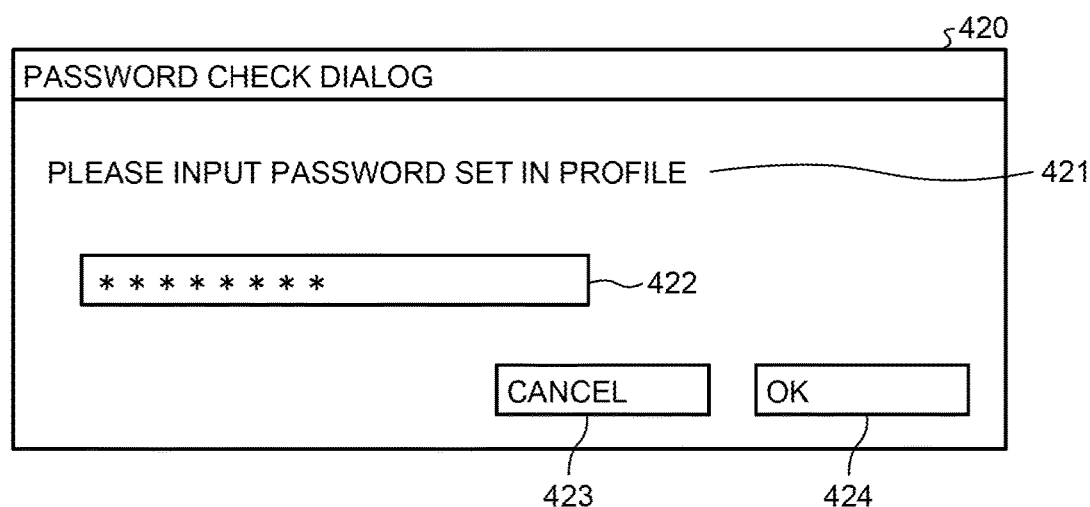
FIG. 13 is a diagram showing an example of a password check dialog.

When the read password is given to the profile, when the user presses the "Yes" button 403 in the import check dialog 400, a password check dialog opens. FIG. 13 is a diagram showing an example of the password check dialog. In a password check dialog 420, a message 421 for requesting an input of a password, a password input column 422, a "cancel" button 423, and an "OK" button 424 are provided.

When the user inputs a password to the password input column 422 and presses the "OK" button 424, if the password is correct, the import of the profile is executed. When the password is wrong, the password check dialog 420 is opened again. On the other hand, when the user presses the "cancel" button 423, the import processing is suspended and the profile is not imported.

Note that, in the above explanation, when exporting the user-defined profile, the password setting function 162 sets the read password in the user-defined profile. However, an edit password (for writing) of the user-defined profile can be set.

Note that, when the "overwrite and save the profile" 324 is selected from the menu 320 in FIG. 8, the selected profile is overwritten and saved as a file having a name same as a name of the selected profile. When the "add name to the profile and save the profile" 325 is selected from the menu 320, the selected profile is saved as a file having a name different from the name of the selected profile. In these cases, if the selected profile is edited, the selected profile is saved in a state in which content of the editing is reflected.

The editing processing for the setting values of the profile, the initialization processing for the user-defined profile, the export processing for the user-defined profile, and the import processing for the user-defined profile in the FA-device-configuration-design supporting apparatus 10 can be configured as a program that stores procedures of the processing. The processing can be realized by causing the FA-device-configuration-design supporting apparatus 10 or an information processing terminal such as a personal computer to execute the program. The program is recorded in a computer-readable recording medium such as a hard disk, a SSD (Solid State Drive), a floppy (registered trademark) disk, a CD (Compact Disk)-ROM, an MO (Magneto-Optical disk), or a DVD (Digital Versatile Disk or Digital Video Disk). The program can also be distributed via a network (a communication line) such as the Internet.

In this embodiment, setting information in a profile is customized by the user and a user-defined profile is created. The user-defined profile can also be used when setting of a same FA device is performed next. Therefore, work for respectively editing setting information in profiles for same FA devices was necessary in the past. There is an effect that it is possible to facilitate setting of the FA devices and reduce setting costs for the FA devices by using one user-defined profile in which a customized value is set in a portion of common setting content.

Because the common setting information concerning the same FA devices is set in the user-defined profile, the user does not need to perform setting for each of the FA devices every time. As a result, there is also an effect that it is possible to reduce setting mistakes.

Further, it is possible to export the user-defined profile and distribute the user-defined profile to other users. Therefore, there is an effect that, even in an environment in which a plurality of people work, it is possible to reduce setting costs and reduce setting mistakes.

Furthermore, when the user-defined profile is exported, the setting for requesting a read password, setting for, when there is a setting value that the exporting user does not desire other users to change, making the setting value un-editable on writing, or the like can be performed. Consequently, there is also an effect that it is possible to prevent a leak of confidential information of a company to which the user using the FA device belongs.

INDUSTRIAL APPLICABILITY

As explained above, the FA-device-configuration-design supporting apparatus according to the present invention is useful for setting of an FA device in a control system including a plurality of FA devices of the same type.

REFERENCE SIGNS LIST

10 FA-device-configuration-design supporting apparatus
11 system-configuration editor unit
12 profile-registration processing unit
13 profile check unit
14 profile storing unit
15 profile editing unit
16 profile creating unit
21 display unit
111 profile read function
112 user-specific-information read function
113 profile-information display function
121 profile import function
122 profile saving function
123 user-defined-profile import function
124 user-defined-profile saving function
131 profile check function
132 user-defined-profile check function
151 user-specific-information-region securing function
152 user-specific-information writing function
153 user-specific-information saving function
154 profile initializing function
161 user-defined-profile export function
162 password setting function
163 un-editability setting function
200A profile
200B user-defined profile

The invention claimed is:

1. A factory automation (FA)-device-configuration-design supporting apparatus that performs editing of a profile including individual identification information and a definition of setting of an FA device and a setting range of the setting, the FA-device-configuration-design supporting apparatus comprising:
a profile storage that stores the profile;
a user-specific-information-region securing processor that secures, for the profile in the profile storage, a write-content input region in which a setting value specific to a user can be written concerning content of an item defined in the profile, and a write-permission-flag input region in which a flag indicating whether editing of the setting value for the item is permitted can be set;
a user-specific-information writing processor that writes, in the write-content input region, the setting value or a range of the setting value of the item indicated by the flag as editable by a user, among the content defined in the profile; and
a user-specific-information saving processor that saves, as a user-defined profile, in the profile storage, the profile including a write content attribute that is the content input to the write-content input region and a flag attribute that is a content of the flag, wherein
in the user defined profile, the setting value or the range of the setting value concerning the item indicated by the flag as editable is editable,
when securing the write-content input region and the write-permission-flag input region, the user-specific-information-region securing processor sets, as the flag, a first flag in the write-permission-flag input region when the content defined in the profile is un-editable information and sets, as the flag, a second flag in the write-permission-flag input region when the content defined in the profile is editable information,
in response to detecting that the flag is set as the second flag and the user is writing the setting value specific to the user in the write-content input region, the user-specific-information writing processor switches the flag from the second flag to a third flag, which indicates that the setting value specific to the user is written, in the write-permission-flag input region corresponding to the write-content input region in which the setting value is written,
the profile includes an initial value of the item defined in the profile,
the user-defined profile includes the write content attribute, the flag attribute, and the initial value, and
when the FA-device-configuration-design supporting apparatus detects a connection to another FA device of a same type as the FA device, the FA-device-configuration-design supporting apparatus uses the saved user-defined profile to set values of the other FA device.

2. The FA-device-configuration-design supporting apparatus according to claim 1, further comprising a user-specific-information read processor that, when reading the user-defined profile from the profile storage, reads out the content defined in the profile serving as a base of the user-defined profile if the first flag or the second flag is written in the write-permission-flag input region and reads out the content written in the write-content input region if the third flag is written.

3. The FA-device-configuration-design supporting apparatus according to claim 1, wherein the user-specific-information saving processor further includes a function of selecting whether the profile, in which the setting value specific to the user is written by the user-specific-information writing processor, is overwritten and saved or saved as another profile.

4. The FA-device-configuration-design supporting apparatus according to claim 1, further comprising a profile initializing processor that returns content of the user-defined profile to a state of the profile serving as a base of the user-defined profile.

5. The FA-device-configuration-design supporting apparatus according to claim 1, further comprising a user-defined-profile export processor that exports the user-defined profile to an external device.

6. The FA-device-configuration-design supporting apparatus according to claim 1, further comprising a password setting processor that sets a password in the user-defined profile.

7. The FA-device-configuration-design supporting apparatus according to claim 1, further comprising an un-editability setting processor that sets the first flag in the write-permission-flag input region of the content selected by the user in the user defined profile and causes the content to be un-editable for a another user who uses the user-defined profile.

8. The FA-device-configuration-design supporting apparatus according to claim 1, further comprising a user-defined-profile import processor that imports the user-defined profile to the profile storage.

9. The FA-device-configuration-design supporting apparatus according to claim 1, further comprising a user-defined-profile check processor that checks whether there is an error in the written setting value specific to the user.

10. A factory automation (FA)-device-configuration-design supporting method for editing a profile including individual identification information and a definition of setting of an FA device and a setting range of the setting, the FA-device-configuration-design supporting method being performed by an FA-device-configuration-design supporting apparatus and comprising:
   securing, for a read profile, a write-content input region in which a setting value specific to a user can be written concerning content of an item defined in the profile, and a write-permission-flag input region in which a flag indicating whether editing of the setting value for the item is permitted can be set;
   writing, in the write-content input region, the setting value or a range of the setting value of the item indicated by the flag as editable by a user, among the content defined in the profile; and
   saving, as a user-defined profile, the profile including a write content attribute that is the content input to the write-content input region and a flag attribute that is a content of the flag, wherein in the user defined profile, the setting value or the range of the setting value concerning an item indicated by the flag as editable is editable,
when securing the write-content input region and the write-permission-flag input region, the securing includes setting, as the flag, a first flag in the write-permission-flag input region when the content defined in the profile is un-editable information and setting, as the flag, a second flag in the write-permission-flag input region when the content defined in the profile is editable information,
in response to detecting that the flag is set as the second flag and the user is writing the setting value specific to the user in the write-content input region, the writing further includes switching the second flag to a third flag, which indicates that the setting value specific to the user is written, in the write-permission-flag input region corresponding to the write-content input region in which the setting value is written,
the profile includes an initial value of the item defined in the profile,
the user-defined profile includes the write content attribute, the flag attribute, and the initial value, and
when the FA-device-configuration-design supporting apparatus detects a connection to another FA device of a same type as the FA device, the FA-device-configuration-design supporting method further includes using the saved user-defined profile to set values of the other FA device.

11. The FA-device-configuration-design supporting apparatus according to claim 1, further comprising a user-specific-information read processor that reads the user-defined profile from the profile storage, and
   the user-specific-information read processor reads, concerning the item defined in the profile, the initial value and the flag attribute, and when the flag indicates the third flag, further reads the write content attribute, and causes to display the initial value, the flag attribute, and the write content attribute to a display that is connected to the FA-device-configuration-design supporting apparatus.

12. The FA-device-configuration-design supporting method according to claim 10, further comprising reading the user-defined profile that is stored, reading, concerning the item defined in the profile, the initial value and the flag attribute, and further reading the write content attribute when the flag indicates the third flag, and displaying the initial value, the flag attribute, and the write content attribute on a display that is connected to the FA-device-configuration-design supporting apparatus.

* * * * *